United States Patent [19]
Weber

[11] 4,446,949
[45] May 8, 1984

[54] CONNECTING ROD AND PISTON DEVICE FOR A BRAKE SLACK ADJUSTER

[75] Inventor: James L. Weber, West Bloomfield, Mich.

[73] Assignee: Rockwell International Corporation, Pittsburgh, Pa.

[21] Appl. No.: 339,037

[22] Filed: Jan. 13, 1982

[51] Int. Cl.³ .............................................. F16D 65/40
[52] U.S. Cl. .............................................. 188/79.5 K
[58] Field of Search ............... 188/79.5 K, 79.5 R, 188/196 R, 196 BA; 74/579 E, 595

[56] References Cited

U.S. PATENT DOCUMENTS

| | | | |
|---|---|---|---|
| 3,921,765 | 11/1975 | Swander | 188/79.5 K |
| 3,949,840 | 4/1976 | Cumming et al. | 188/79.5 K |
| 4,071,120 | 1/1978 | Hagin | 188/79.5 K |
| 4,114,733 | 9/1978 | Knight | 188/79.5 K X |
| 4,150,735 | 4/1979 | Acre et al. | 188/79.5 K X |

Primary Examiner—Duane A. Reger

[57] ABSTRACT

An improved connecting rod and piston device are provided for a brake slack adjuster. The connecting rod is formed of steel rod material having its opposite ends bent perpendicular to an elongated intermediate section. The first end is received within brake actuation linkage and the second end is received within a radial bore formed in the piston device to be entrapped therein when the piston device is installed in the brake slack adjuster.

2 Claims, 3 Drawing Figures

U.S. Patent  May 8, 1984  4,446,949
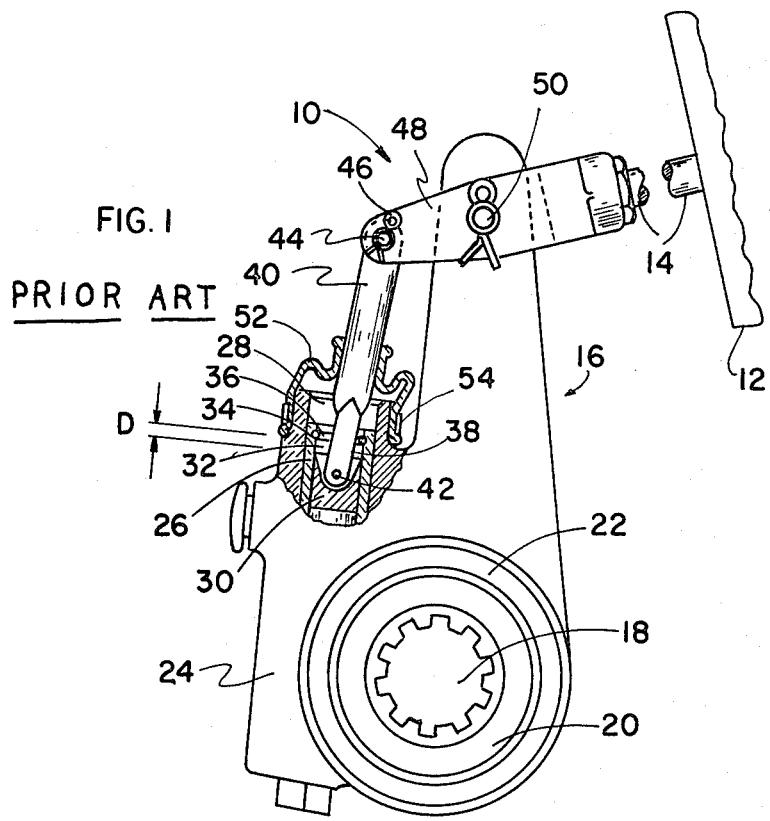
FIG. 1
PRIOR ART
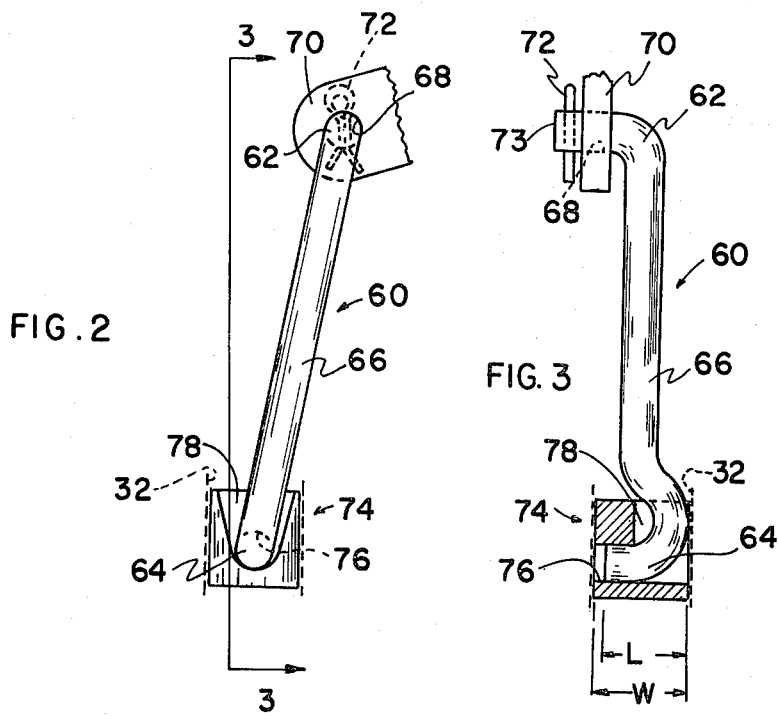
FIG. 2
FIG. 3

CONNECTING ROD AND PISTON DEVICE FOR A BRAKE SLACK ADJUSTER

BACKGROUND OF THE INVENTION

1. Field of the Invention

This invention relates to an improved connecting rod and piston device for a brake slack adjuster and, more specifically, to such an improved connecting rod and piston device which are reliable, less expensive to provide and easier to assemble.

2. Description of the Prior Art

Although an existing brake actuation system such as that disclosed in U.S. Pat. No. 3,949,840 has been extensively utilized to provide satisfactory brake operation, there remains a need for any improvements thereto which will insure its continued reliability, reduce its overall cost and simplify its assembly requirements. Accordingly, it has been found that the prior art connecting rod and piston device utilized in the brake slack adjuster disclosed in the brake actuation system of U.S. Pat. No. 3,949,840 could be so improved without altering the basic function and operation of the brake actuation system. An improvement of this type in one specific brake actuation system might be applicable for other brake actuation systems and, therefore, might be advantageously employed elsewhere.

SUMMARY OF THE INVENTION

It is, therefore, an object of this invention to provide an improved connecting rod and piston device for a brake slack adjuster which is reliable, less expensive to provide and allows for simplified assembly.

These and other objects of the invention are provided in a preferred embodiment thereof which includes an improved connecting rod and piston device for a brake slack adjuster of the type used to produce desired readjustment of the coupling between a brake cam shaft and a brake actuation lever. The brake actuation lever is caused to rotate about the brake cam shaft by actuation linkage means. The slack adjuster includes a plunger having a chamber therein for receipt of the piston device which is capable of limited axial movement within the chamber. The connecting rod is utilized to connect the piston device to the actuation linkage means to produce axial movement of the piston device corresponding to the rotation of the actuation lever. As a result, predetermined excessive rotation of the actuation lever by the actuation linkage will cause the piston device to move axially to relocate the plunger to produce the desired readjustment of the coupling by the slack adjuster. The improvement includes the connecting rod being formed of steel rod material which is bent at each end thereof to be perpendicular to a longitudinally extending intermediate section between the ends. A first end of the connecting rod is received within a hole in the actuation linkage means. The piston device includes a radial bore therethrough which intersects an axially extending opening therein. The second end of the connecting rod and an adjacent portion of the intermediate section are respectively received within the radial bore and the axially extending opening of the piston device. The second end has an overall length which is less than the width of the chamber but too great to allow its removal from the bore when the piston device is installed within the chamber.

BRIEF DESCRIPTION OF THE DRAWINGS

FIG. 1 is an elevational view partially in section of the prior art brake actuation system including the prior art connecting rod and piston device of the slack adjuster therefor.

FIG. 2 is an elevational view of the connecting rod and piston device of the present invention as it would appear in the brake actuation system as shown in FIG. 1.

FIG. 3 is a view of the connecting rod and piston device of the present invention as seen along Line 3—3 of FIG. 2.

DETAILED DESCRIPTION OF THE PREFERRED EMBODIMENT

As seen in FIG. 1, a brake actuation system 10 is for a brake assembly and is of the type disclosed in U.S. Pat. No. 3,949,840 which is incorporated by reference herein. Although the description provided therein is adequate for one to understand the function and purpose of the connecting rod and piston device which are improved by this invention, an explanation of the significant features will be provided herein to enable one to nevertheless understand the purpose and operation of the improved connecting rod and piston device.

The brake actuation system 10 is utilized with a cam operated, dual brake shoe system which is well known in the prior art and is normally operated by depressing the vehicle brake pedal supplying fluid pressure, usually air, to an actuating motor 12. The fluid pressure operating on piston or diaphragm in the motor 12 forces an actuating rod 14 outwardly of the motor housing thereby rotating a actuation lever 16 and cam shaft 18 in a counter-clockwise direction as viewed in FIG. 1 about the axis of the cam shaft 18. The cam shaft 18 rotates brake actuating cams (not shown) to force brake shoes in the brake to be pivoted outwardly until the brake shoe linings thereof are pressed into frictional, braking contact with a brake drum. When the brake pedal is released, fluid pressure is exhausted from the actuating motor 12 and means internally of the motor 12, usually a spring, return the actuating rod 14 and lever 16 to their normally retracted position as shown in FIG. 1. When the fluid pressure is exhausted from the actuating motor 12, the brake shoes and linings are returned by springs to their normal running position to provide a clearance space between the linings and the brake drum. However, with extended use of the brake system, wear in the linings would cause the initial spacing between the linings and the brake drum to become excessive so that it would be possible to produce actuation in the manner described hereinabove without properly applying sufficient braking force to the drum. Accordingly, to insure that the actuation lever 16 will be rotated properly to produce braking, the actuating lever 16 is not directly coupled to the cam shaft 18 but is instead coupled through a coupling member 20 which can be readjusted throughout brake shoe lining life to insure that the cams are properly repositioned to direct the brake shoes into braking contact with the brake drum. Specifically, the coupling member 20 in the brake assembly disclosed in U.S. Pat. No. 3,949,840 is in the form of a worm wheel which is mounted within the housing 22 of the actuation lever 16.

To automatically readjust the position of the coupling member 20 relative to the lever 16, the housing 22 of the lever 16 also includes a slack adjuster mechanism 24.

Various details of the slack adjuster mechanism 24 are omitted from the view as seen in FIG. 1 but it is sufficient for an understanding of the present invention to realize that a worm gear within the slack adjuster can be caused to rotate to reposition the coupling member 20 relative to the housing 22. Rotation of the worm gear is accomplished by specific axial movement of a plunger 26 within a bore 28 of the slack adjuster 24.

A prior art piston device 30 is freely, slidably disposed within the interior 32 of the plunger 26. The hollow interior of the plunger 26 is provided a circumferentially extending groove 34 axially outwardly of the piston 30. A retaining ring 36 is fitted to the groove 34 to prevent the piston device 30 from being withdrawn from the plunger 26 and to provide a piston engaging abutment for moving the plunger axially outwardly of the bore 28 in response to axially outward movement of the piston device 30 beyond a distance D as shown in FIG. 1.

The prior art piston device 30 is diametrically slotted to receive a flat end 38 of a prior art connecting rod 40 pivotally connected to the piston device 30 by a pin 42. The opposite end of the connected rod 40 is pivotally connected by means of a pin 44 and cotter key 46 to the bifrucated end of a clevis 48. The opposite end of the clevis 48 is provided an internally threaded bore (not shown) which receives the threaded end of the brake actuating rod 14. The end of the actuating lever 16 opposite the cam shaft 18 extends between the legs of the bifrucated end of the clevis 48 where it is pivotally connected by a pin and cotter key configuration 50 passing through an appropriate sized hole in the lever 16.

The end of the bore 28 receiving the prior art connecting rod 40 is closed by a flexible boot seal 52 elastically, snugly fitted about the rod 40 and secured by a retaining clamp 54 to a boss-like projection on the housing 22 of the lever 16.

During normal operation of the brake actuation system 10, the actuating rod 16, as mentioned above, will move to the left when the brake is being actuated. As the actuating lever 16 rotates about the cam shaft 18, the extended end of the clevis 48 will cause corresponding movement of the piston device 30 within the hollow interior 32 of the plunger 26. Although it may not be immediately apparent, as the actuating lever 16 rotates counter-clockwise, the extended end of the clevis 48 will tend to pivot around the pin 50 so that the movement of the piston device 30 will be outwardly toward the retaining ring 36. As the brake shoes are cycled, if there is adequate lining thereon, the movement of the piston device 30 will be limited to the distance D so that no repositioning or movement of the plunger 26 will be produced. However, as the linings become significantly worn so that readjustment is desired, the actuating lever 16 will tend to rotate through a greater arc of rotation and the extended end of the clevis 48 will retract the piston device 30 to produce contact against the retaining ring 36. When the continued movement of the piston device 30 becomes excessive, it will relocate the plunger 26 sufficiently to cause rotation of the worm gear within the slack adjuster 26 to readjust the coupling between the brake cam shaft 18 and the actuating lever 16. After this is accomplished, release of the brake pedal will allow the lever 16 to be returned to its original position and the cams within the brake itself will have been repositioned to establish a new, unactuated position for the brake shoes to compensate for the wear of the linings thereon.

As thus described, the prior art connecting rod 40 and piston device 30 are capable of providing the desired movement needed to insure proper slack adjustment. However, it has been found that their manufacture includes steps which can be eliminated and requires assembly which can be simplified by the present invention.

As seen in FIGS. 2 and 3, the improved connecting rod 40 is formed of a steel rod material without any need for flattening one end thereof or providing pin receiving holes at the opposite ends thereof. Specifically, the connecting rod 60 is preferably made of SAE 1020 or 1040 steel wire which is about 0.25 inches in diameter. The opposite first end 62 and second end 64 are bent to be perpendicular to a longitudinally extending intermediate section 66 therebetween. The first end 62 is received within a hole 68 of an extended leg portion 70 of a clevis device which is similar in function to the clevis 48 described hereinabove. Obviously, directly installing the end 62 in the hole 68 has eliminated the need for the pin 44 of the prior art connecting rod 40. Additionally, the use of the preferred connecting rod 60 eliminates the need for both legs of the bifrucated end of the clevis 48 as described hereinabove so that only one extended leg 70 is not required or desired. A cotter pin 72 is again employed to insure that the connecting rod 60 will be retained at the extended leg 70. However, it would be possible in some configurations to produce an additional bend at the terminal portion 73 of the end 62 to prevent its withdrawal from the hole 68 if so desired. Once the connecting rod 60 is fully assembled in the slack adjuster, the angular movement of the connecting rod 16 relative to the extended leg 70 would be restricted so that the further bending of the terminal portion 73 thereof could insure its retention within the hole 68.

The improved piston device 74 includes exterior dimensions which are identical to those which exist in the prior art piston device 30. However, rather than being provided a diametrical slot, the improved piston device 74 is provided a radial bore 76 therethrough which intersects an axially extending opening 78 therein. The second end 64 of the connecting rod 60 and an adjacent portion of the intermediate section 66 of the connecting rod 60 are respectively received in the bore 76 and the axially extending opening 78 to insure that movement of the extended end 70 of the actuating linkage will result in corresponding movement of the piston device 74. Specifically, the axially extending opening 78 is provided a greater width at the end thereof remote from the bore 76 to allow some relative angular movement of the connecting rod 60 within the piston device 74 which will occur during movement of the connecting rod 60 as the actuating lever 16 is being rotated.

To insure the retention of the second end 64 within the bore 76, it is provided an overall length L which is less than the width W of the interior 32 of the plunger 26. However, the overall length L is too great to allow its removal from the bore 76 when the piston device is fully installed within the interior 32 of the plunger 26.

As thus described, the improved connecting rod and piston device of the present invention for a brake slack adjuster eliminates the need for the previously employed pivot pins 42 and 44. The added manufacturing steps required of drilling holes in the opposite ends of the connecting rod 40 for their receipt and the additional time required for their assembly have therefore been eliminated. Although a preferred embodiment of the invention is taught herein, it should be clear that the present invention could be utilized with other types of slack adjuster systems without departing from the spirit of the invention as claimed.

I claim:

1. An improved connecting rod and piston device for a brake slack adjuster of the type used to produce desired readjustment of a coupling between a brake cam shaft and a brake actuation lever, said brake actuation lever being caused to rotate about said cam shaft by actuation linkage means, said slack adjuster including a plunger having a chamber therein for receipt of said piston device, said piston device being capable of limited axial movement within said chamber, said connecting rod being utilized to connect said piston device to said actuation linkage means to produce axial movement of said piston device corresponding to said rotation of said actuation lever, whereby predetermined excessive said rotation of said actuation lever by said actuation linkage means will cause said piston device to move axially to relocate said plunger to produce said readjustment of said coupling by said slack adjuster, said improvement comprising:

said connecting rod being formed of steel rod material which is bent at each end thereof to be perpendicular to a longitudinally extending intermediate section between each said end;

a first of said ends of said connecting rod being received within a hole in said actuation linkage means;

said piston device including a radial bore therethrough which intersects an axially extending opening therein;

a second of said ends of said connecting rod and an adjacent portion of said intermediate section being respectively received within said bore and said axially extending opening of said piston device; and said second end having an overall length which is less than a width of said chamber and too great to allow its removal from said bore when said piston device is in said chamber.

2. The improved connecting rod and piston device as set forth in claim 1, wherein said axially extending opening in said piston device is wider at a region thereof remote from said bore to allow limited angular movement of said connecting rod relative to said piston device when said second end is received within said radial bore thereof.

* * * * *